United States Patent [19]
Pusateri

[11] Patent Number: 6,027,099
[45] Date of Patent: Feb. 22, 2000

[54] TIP VALVE FOR PNEUMATIC TOOL

[75] Inventor: Daniel S. Pusateri, Grayslake, Ill.

[73] Assignee: Snap-on Tools Company, Kenosha, Wis.

[21] Appl. No.: 09/044,942

[22] Filed: Mar. 20, 1998

[51] Int. Cl.$^7$ ................................................. F16K 31/00
[52] U.S. Cl. ........................................ 251/339; 251/228
[58] Field of Search .................................. 251/228, 229, 251/237, 238, 240, 241, 263, 239, 268, 339

[56] References Cited

U.S. PATENT DOCUMENTS

| | | |
|---|---|---|
| 674,696 | 5/1901 | Gardenier . |
| 1,327,687 | 1/1920 | Smith . |
| 2,009,575 | 7/1935 | Card, Jr. . |
| 2,605,808 | 8/1952 | Current . |
| 3,095,896 | 7/1963 | Ross . |
| 3,443,646 | 5/1969 | Baker et al. . |
| 3,476,147 | 11/1969 | Hitt et al. . |
| 3,646,955 | 3/1972 | Olde . |
| 3,698,431 | 10/1972 | Thompson . |
| 3,988,001 | 10/1976 | Kankaras . |
| 4,258,799 | 3/1981 | Eckman . |
| 4,265,322 | 5/1981 | Emonet . |
| 4,476,942 | 10/1984 | Elkin . |
| 4,485,698 | 12/1984 | Adman et al. . |
| 4,523,700 | 6/1985 | Bower et al. . |
| 4,653,722 | 3/1987 | Hupee . |
| 4,970,920 | 11/1990 | Albert et al. . |
| 5,205,540 | 4/1993 | Clapp ........................................ 251/339 |
| 5,439,332 | 8/1995 | Spitznagel . |
| 5,531,279 | 7/1996 | Biek . |
| 5,788,219 | 8/1998 | Nakajima ................................. 251/339 |

*Primary Examiner*—John Fox
*Attorney, Agent, or Firm*—Emrich & Dithmar

[57] ABSTRACT

A tip valve for a pneumatic tool includes a first valve member having a bore with a central axis and defining a valve seat about the bore and a second valve member having an engaging surface engageable with the valve seat to form a substantially fluid-tight seal therewith. A stem is coupled to the second valve member and extends through the bore, with at least a portion of the stem being offset from the axis, and a valve operating member is coupled to the stem for movement between a closed position wherein the second valve engages the valve seat to close the bore and an open position wherein the second valve member is tilted from the valve seat to open the bore. A spring urges the second valve member and the valve operating member to the closed position. In one embodiment, the stem is bent and in another it is straight but eccentrically mounted on the second valve member.

13 Claims, 3 Drawing Sheets

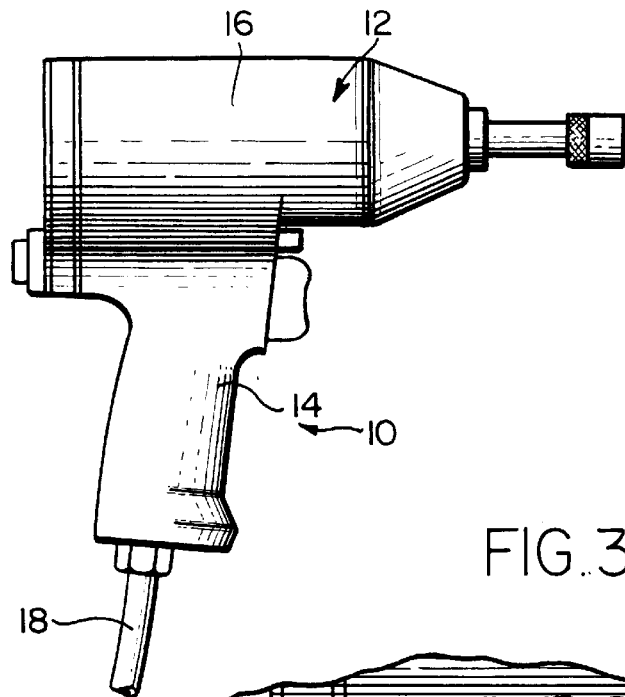
FIG. 1
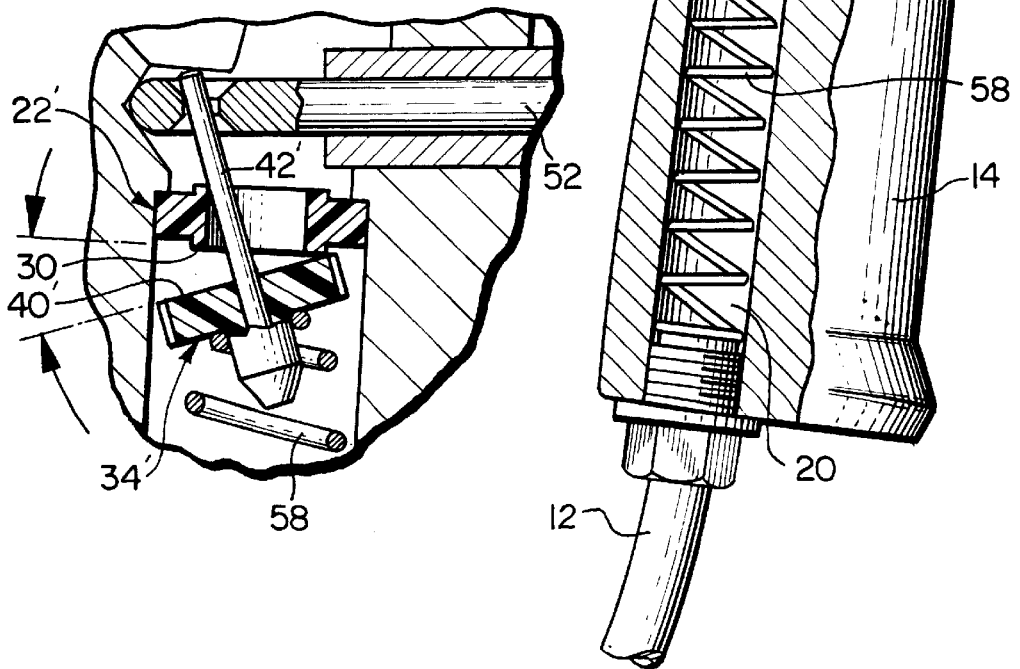
FIG. 2 PRIOR ART
FIG. 3

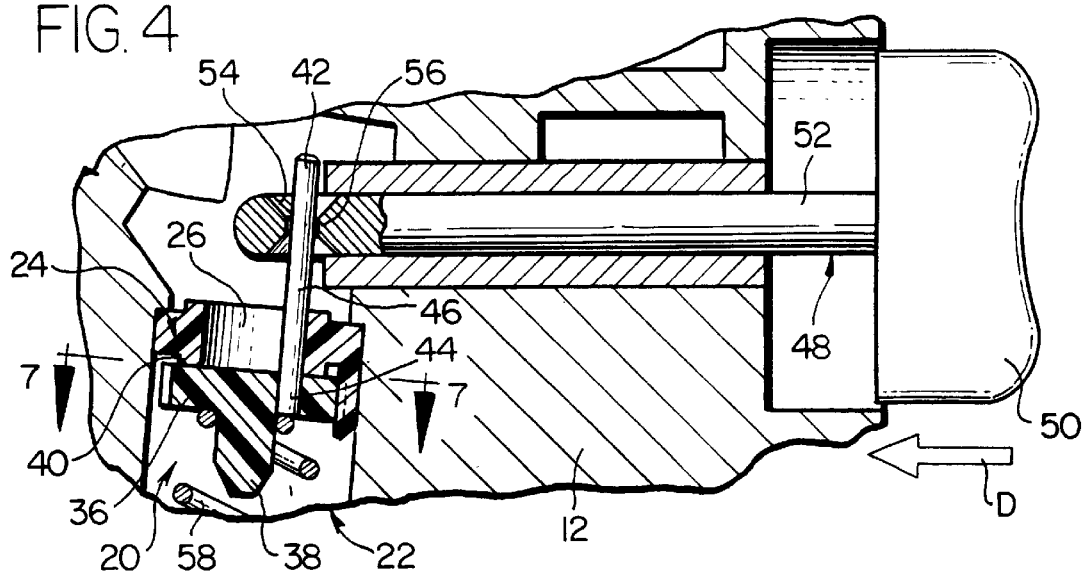
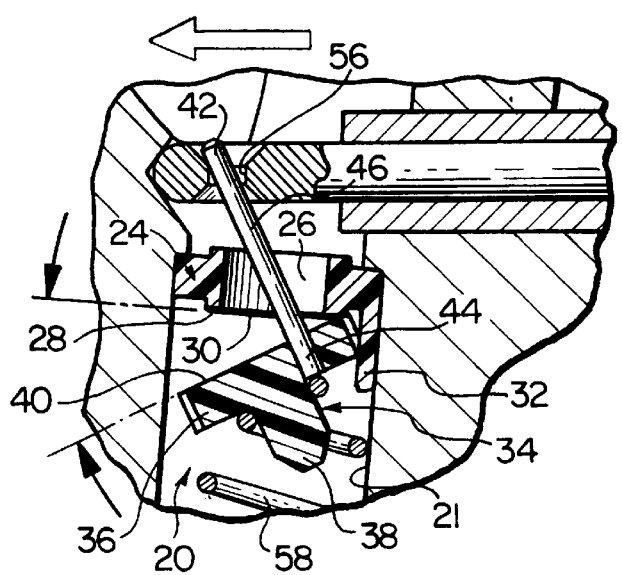
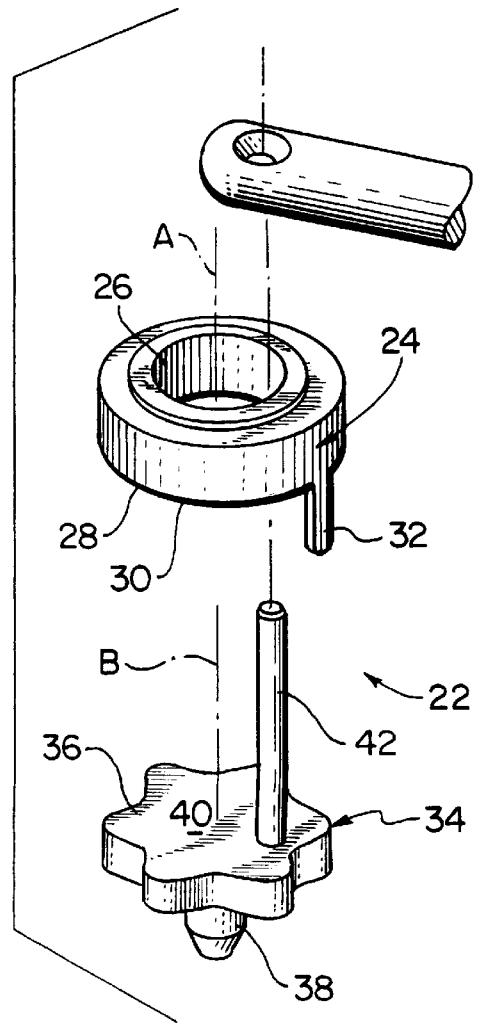
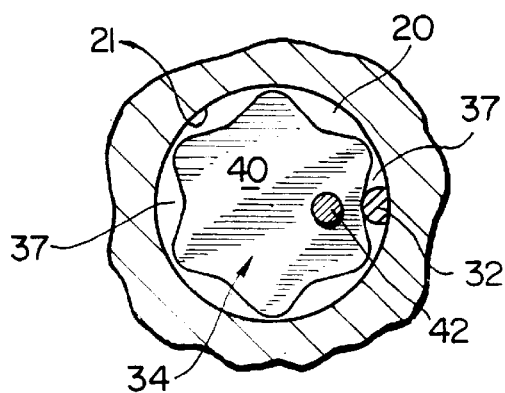

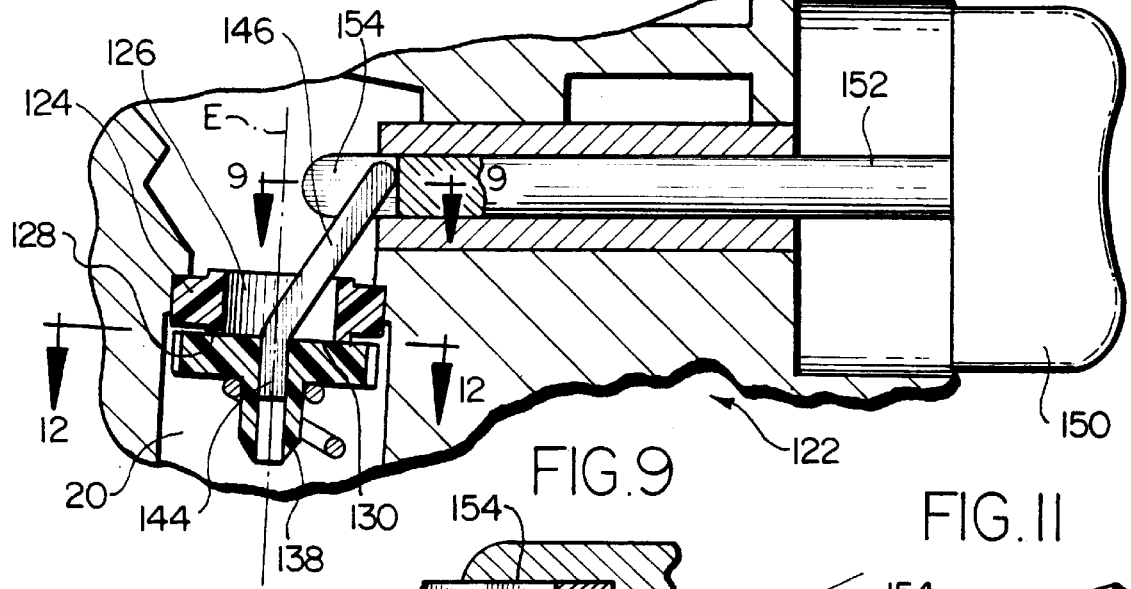
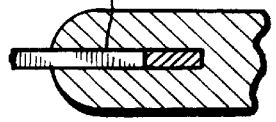
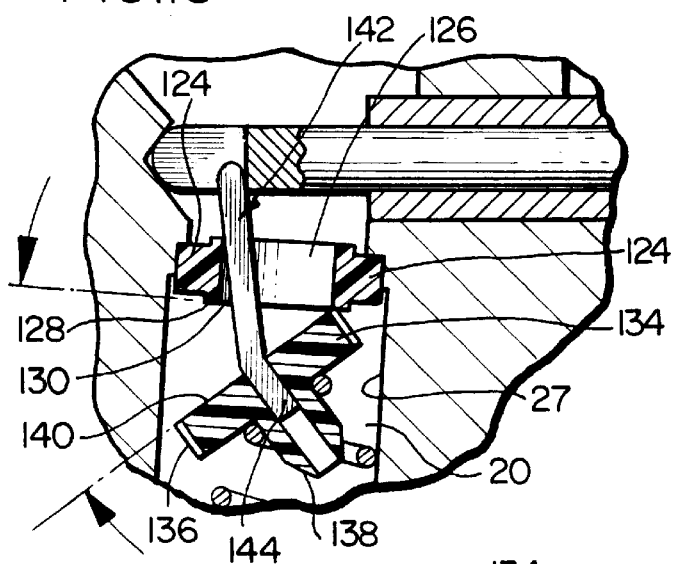
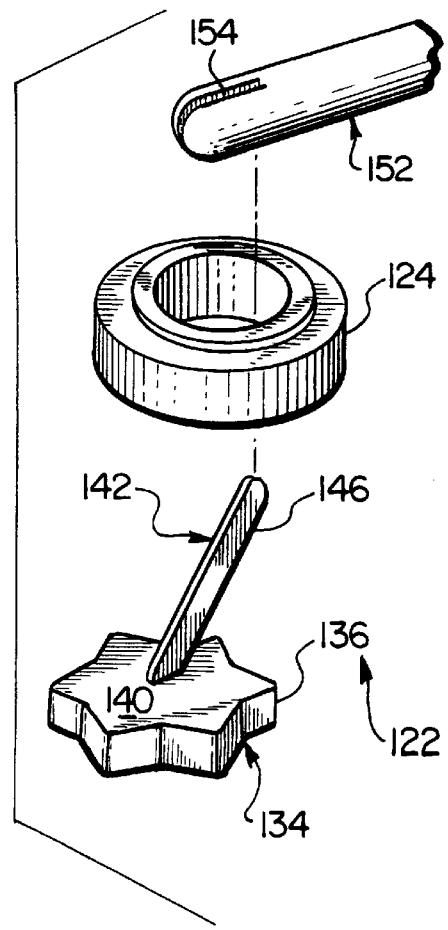
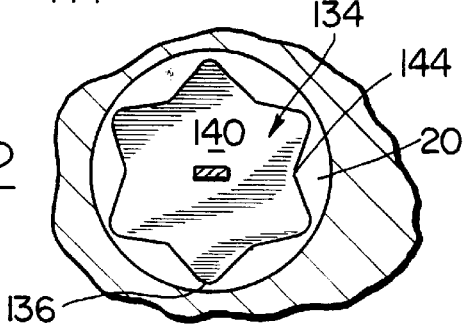

TIP VALVE FOR PNEUMATIC TOOL

BACKGROUND OF THE INVENTION

1. Field of the Invention

This invention relates generally to pneumatic tools and in particular to operating valves for such tools.

2. Description of the Prior Art

The motors of many tools are pneumatically controlled. Tip valves for restricting and controlling the air flow for these pneumatic tools have previously been provided. As seen in FIG. 2, these prior art valves include a valve seat having a bore (to allow air flow therethrough) with a central axis and a second valve member having an engaging surface biased against the valve seat to form a substantially fluid-tight seal and a stem coupled to the second valve member and coaxially disposed through the bore in the normal closed position. The stem is coupled to a trigger mechanism for opening and closing the valve. Depressing of the trigger tilts or tips the stem and the engaging surface away from the valve seat.

This tipping allows air flow through the bore of the valve seat. However, the constraints of the cylinder in which the second valve member sits does not allow the second valve member to tip far enough so that it does not impede air flow and allows maximum flow through the bore to efficiently operate the pneumatic motor.

Attempts to solve this problem have simply included enlarging the second valve member and bore therethrough. This solution, however, results in the widening the handle of the tool which surrounds the valve seat, making the handle too large and cumbersome to use comfortably.

SUMMARY OF THE INVENTION

It is a general object of the invention to provide an improved tip valve for pneumatic tools which avoids the disadvantages of prior valves while affording additional structural and operating advantages.

An important feature of the invention is the provision of a tip valve which is of relatively simple and economical construction.

A still further feature of the tip valve of the present invention is that it allows maximum air flow therethrough without increasing the size of tool wherein it is incorporated.

One or more of these features may be attained by providing a tip valve for a pneumatic tool having a body. The tip valve includes a first valve member having a bore with a central axis and defining a valve seat about the bore and a second valve member having an engaging surface engageable with the valve seat to form a substantially fluid-tight seal therewith. The tip valve also includes a stem coupled to the second valve member and disposed through the bore, wherein at least a portion of the stem is offset from the axis and a valve operating member coupled to the stem and mounted in the body for movement between a closed position wherein the second valve member is engaged with the valve seat and an open position wherein the second valve member is tilted from the valve seat to permit air flow through the bore. The tip valve also includes resilient structure disposed in the body urging the second valve member against the valve seat and the valve operating member to its closed position.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of the pneumatic tool of the present invention;

FIG. 2 is a fragmentary, sectional view of a prior art tip valve;

FIG. 3 is an enlarged, fragmentary, side elevational view of the handle of the tool of FIG. 1, partially broken away and partially in section to illustrate the tip valve of a first embodiment of the present invention;

FIG. 4 is a further enlarged, fragmentary, sectional view of the tip valve of FIG. 3 in the closed position;

FIG. 5 is a view similar to FIG. 4 of the tip valve in the open position;

FIG. 6 is an exploded, perspective view of some of the components of the tip valve of FIG. 3;

FIG. 7 is a sectional view taken generally along lines 7—7 of FIG. 4;

FIG. 8 is a view similar to FIG. 4 illustrating a second tip valve of the present invention in the closed position;

FIG. 9 is a sectional view taken generally along the line 9—9 of FIG. 8;

FIG. 10 is a view similar to FIG. 8 illustrating the tip valve thereof in the open position;

FIG. 11 is an exploded, perspective view of some of the components of the tip valve of FIG. 8; and FIG. 12 is a sectional view taken generally along the line 12—12 of FIG. 8.

DETAILED DESCRIPTION OF THE PREFERRED EMBODIMENTS

Referring to FIGS. 1 and 3, a pneumatic tool, such as an impact wrench 10, is illustrated. The impact wrench 10 includes a body 12 which includes a hand grip portion 14 and a motor housing portion 16. The motor (not shown) of the impact wrench 10 is run in a known manner by compressed air which is supplied through an external air line 18 connected to an air source (not shown) and through a cylindrical air channel 20 formed by a cylindrical wall 21 within the hand grip portion 14.

A tip valve 22 is provided to control the amount of air delivered to the motor. As seen in FIGS. 4–6, the tip valve 22 includes a first valve member 24 fixed in the upper end of air channel 20 by a friction fit or the like. The first valve member 24 includes a central bore 26 having a central axis "A" (FIG. 6).

The first valve member has a bottom end 28 which defines a valve seat 30 about the bore 26. As discussed below, the first valve member 24 includes a projecting structure 32 which projects and depends from the bottom end 28.

The tip valve 22 also includes a second valve member 34 having a central axis, an upper star-shaped portion 36 and a bullet-shaped lower portion 38 depending axially therefrom.

The outer periphery of the star-shaped portion 36 forms a plurality of recesses 37 between the star-shaped portion 36 and the cylindrical wall 21. The star-shaped portion 36 has a substantially planar engaging surface 40 engageable, as seen in FIG. 4, with the valve seat 30 to form a substantially fluid-tight seal.

The tip valve 22 also includes an elongated straight stem 42 having an axis offset from and parallel to the central axis of the second valve member 34. The stem 42 has a first end 44 coupled to or imbedded in the second valve member 34 and a second end 46 disposed through the bore 26.

The tip valve 22 further includes an operating member 48 which includes a trigger button 50 projecting outside the body 12 and coupled to an end of an elongated rod 52. The elongated rod 52 includes a bore 54 at its other end. The bore 54 is chamfered at both its ends and has a narrower diameter central portion 56. The operating member 48 is engageably coupled to the stem 42 which is disposed through the bore 54.

The tip valve 22 also includes resilient structure, such as a coil spring 58 disposed in the air channel 20 of the body 12 and about the lower portion 38 of the second valve member 34 for biasing the valve closed. As seen in FIG. 4, as the coil spring 58 urges the engaging surface 40 of the second valve member 34 into engagement with valve seat 30 to form a substantially liquid-tight seal therebetween, the stem 42 coupled to the elongated rod 52 maintains the operating member 48 in the closed position. When the operating member 48 is in the closed position, the stem 42 is offset from the central axis "A" of the bore 26 and is disposed between axis "A" and the trigger button 50.

The operating member 48 is moveable from the closed position in FIG. 4 to an open position as shown in FIG. 5. A user simply pushes the trigger button 50 in the direction of arrow D in FIG. 5, which causes the elongated rod 52 to move in the same direction and causes the stem 42 coupled thereto to tip the engaging surface 40 of the second valve member 34 away from the valve seat 30 to allow air to flow through the bore 26 to power the pneumatic motor. Since the stem 42 is offset from the axis of the second valve member 34, it allows the engaging surface 40 to be tipped at least 30 degrees away from the plane of the valve seat 30 to reduce restriction of air flow through bore 26 by the second valve member 34. It has been found that, when the angle formed between the plane of the engaging surface 40 and the plane of the valve seat 30 is greater than about 30 degrees, the second valve member 34 substantially does not restrict air flow through the bore 26.

This is a great improvement over the prior art tip valves, an example of which is seen in FIG. 2, wherein like reference numerals refer to like parts. The prior art tip valve 22' had a second valve member 34' having a central axis and an elongated straight stem 42' which is substantially coaxial with the axis of the second valve member 34'. The location of the stem 42' with respect to the axis of the second valve member 34' allows the engaging surface 40' of the second valve member 34' to be tipped only a relatively small angle, substantially less than 30 degrees, with respect to the plane of valve seat 30. At this smaller tipping angle, the second valve member 34' restricts air flow through the bore 26.

The tip valve 22 of the present invention also includes structure for substantially preventing the second valve member 34 and stem 42 from rotating about either of their respective axes in use. If the second valve member 34 were to be rotated, the stem 42 could no longer be disposed between the axis "A" and the trigger button 50 in the closed position of the operating member 48 thereby preventing the engaging surface 40 from being tipped at as great an angle as shown in FIG. 5. As best seen in FIG. 7, projecting structure 32 is disposed in a recess 37 which prevents such rotation. Alternatively, the projecting structure 32 may not be necessary, if the central portion 56 of bore 54 of the elongated rod 52 is small enough to prevent rotation.

FIGS. 8–12 show a second tip valve 122 substantially identical to the tip valve 22 of FIGS. 1 and 3–7. As seen in FIGS. 8, 10 and 11, the tip valve 122 includes a first valve member 124 fixed in the upper end of air channel 20 by a friction fit or the like. The first valve member 124 includes a central bore 126 having a central axis "E" (FIG. 8), and a bottom end 128 which defines a valve seat 130 about the bore 126.

The tip valve 122 also includes a second valve member 134 having a central axis, an upper star-shaped projection 136 and a bullet-shaped lower portion 138 depending axially therefrom. The star-shaped portion 136 has a substantially planar engaging surface 140 engageable, as seen in FIG. 10, with the valve seat 130 to form a substantially fluid-tight seal.

The tip valve 122 also includes a bar-shaped stem 142. The stem 142 has a first portion 144 coupled to or embedded in the second valve member 134 coaxially therewith and a second portion 146 disposed through the bore 126 and inclined with respect to the first portion 144.

The tip valve 122 further includes an operating member 148. The operating member 148 includes a trigger button 150 projecting outside the body 12 coupled to an end of an elongated rod 152. The other end of the elongated rod 152 is bifurcated to form a slot 154. The second portion 146 of the operating member 148 is engaged in the slot 154, as is best seen in FIG. 9.

The tip valve 122 also includes resilient structure, such as a coil spring 158 disposed about lower portion 138 and in the air channel 20 of the body 12 urging the valve closed. The coil spring 158 as seen in FIG. 8 as the coil spring 158 urges the engaging surface 140 of the second valve member 134 into engagement with valve seat 130 to form a substantially fluid-tight seal therebetween. Additionally, the second portion 146 of the stem 142 coupled to the elongated rod 152 maintains the operating member 148 in the closed position. When the operating member 148 is in the closed position, the second portion 146 of stem 142 is inclined from the central axis "t" of the bore 126 and disposed between axis "E" and the trigger button 150.

The operating member 148 is moveable from the closed position in FIG. 9 to an open position as shown in FIG. 10. A user simply pushes the trigger button 150 in the direction of arrow H in FIG. 9, which causes the elongated rod 152 and the stem 142, to move in the same direction, tipping the engaging surface 140 of the second valve member 134 more than 30 degrees away from the valve seat 130 to allow air to flow substantially unrestricted through the bore 126 to power the pneumatic motor.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A tip valve for a pneumatic tool having a body, the tip valve comprising:

a first valve member having a bore with a central axis and defining a valve seat about the bore;

a second valve member having an engaging surface engageable with the valve seat to form a substantially fluid-tight seal therewith;

a stem fixedly coupled to the second valve member and disposed through the bore, wherein at least a portion of the stem is offset from the axis;

a valve operating member coupled to the stem and mounted in the body for movement between a closed position wherein the second valve member is engaged with the valve seat and an open position wherein the second valve member is tilted from the valve seat to permit air flow through the bore; and resilient structure disposed in the body urging the second valve member against the valve seat and the valve operating member to its closed position.

2. The valve of claim 1, wherein the stem is straight and has a stem axis parallel to the axis of the bore.

3. The valve of claim 2, wherein the valve operating member has a first end coupled to the stem and a second end coupled to a trigger button, wherein the stem axis is between the trigger button and the axis of the bore in the closed position.

4. The valve of claim 3, wherein the second valve member has an outer periphery with at least one recess therein, and further comprising a projecting structure fixed with respect to the body and disposed in the recess, whereby the projecting structure substantially prevents rotation of the second valve member.

5. The valve member of claim 4, wherein the projecting structure is coupled to the first valve member.

6. The valve member of claim 4, wherein the outer periphery of the second valve member is star-shaped.

7. The valve member of claim 1, wherein the stem has an angled portion inclined with respect to the axis of the bore.

8. The valve of claim 7, wherein the valve operating member has a slotted first end coupled to the stem and a second end coupled to a trigger button, and wherein the angled portion has a free end disposed between the trigger button and the axis of the bore in the closed position.

9. The valve of claim 1, wherein the seat defines a first plane and the engaging surface defines a second plane, and wherein when the valve operating member is in the open position the angle between the first and second planes is at least about 30°.

10. A tip valve for a pneumatic tool having a body, the tip valve comprising:

a first valve member having a bore with a central axis and defining a valve seat about the bore;

a second valve member having an engaging surface engageable with the valve seat to form a substantially fluid-tight seat therewith;

a valve operating member mounted in the body for movement between closed and open positions;

the valve operating member and said second valve member respectfully being disposed on opposite sides of the first valve member;

a stem fixedly coupled to the second valve member and extending non-coaxially through the bore and interconnecting the second valve member and the valve operating member;

wherein when the valve operating member is in its closed position, the second valve member is engaged with the valve seat;

wherein when the valve operating member is in its open position, the second valve member is tilted from the valve seat to permit air flow through the bore; and resilient structure disposed in the body urging the second valve member against the valve seat and the valve operating member to its closed position.

11. The valve of claim 10, wherein the stem is straight and has a stem axis parallel to the axis of the bore.

12. The valve member of claim 10, wherein the stem has an angled portion inclined with respect to the axis of the bore.

13. The valve of claim 12, wherein the structure further includes a second portion coupled to the angled portion and the second valve member.

\* \* \* \* \*

UNITED STATES PATENT AND TRADEMARK OFFICE
CERTIFICATE OF CORRECTION

PATENT NO : 6,027,099

DATED : Feb. 22, 2000

INVENTOR(S) : Daniel S. Pusateri

It is certified that error(s) appear in the above-identified patent and that said Letters Patent are hereby corrected as shown below:

Column 6, line 15, replace "seat" with --seal--.

Signed and Sealed this

Seventeenth Day of April, 2001

*Attest:*

NICHOLAS P. GODICI

*Attesting Officer*     *Acting Director of the United States Patent and Trademark Office*